(12) United States Patent
Nivens, Jr. et al.

(10) Patent No.: US 7,181,964 B2
(45) Date of Patent: Feb. 27, 2007

(54) LIQUID FLOW METER (76) Inventors: Kirk N. Nivens, Jr., 1063 Old Olive Branch Rd., Black Creek, GA (US) 31308; Kirk Nathan Nivens, 505 Park Pl., P.O. Box 916, Black Creek, GA (US) 31308

( * ) Notice: Subject to any disclaimer, the term of this patent is extended or adjusted under 35 U.S.C. 154(b) by 17 days.

(21) Appl. No.: 11/129,840

(22) Filed: May 16, 2005

(65) Prior Publication Data
US 2006/0254352 A1    Nov. 16, 2006

(51) Int. Cl.
*G01F 3/24*    (2006.01)
(52) U.S. Cl. ...................................................... 73/217
(58) Field of Classification Search ................... 73/217, 73/861.73, 861.75, 861.77, 861.78, 861.79, 73/861.91, 861.88; 138/39, 118; 285/132.1; 210/170, 195; 405/36
See application file for complete search history.

(56) References Cited

U.S. PATENT DOCUMENTS

| 4,275,291 | A |    | 6/1981  | Feller            |
|-----------|---|----|---------|-------------------|
| 4,306,457 | A |    | 12/1981 | Fukui et al.      |
| 4,553,433 | A |    | 11/1985 | Hicks             |
| 4,838,731 | A |    | 6/1989  | Gavin             |
| 4,848,164 | A | *  | 7/1989  | Quarve et al. ............ 73/861.77 |
| 6,217,760 | B1| *  | 4/2001  | Bovington ............... 210/195.1 |
| 6,487,919 | B1| *  | 12/2002 | Edwards .................. 73/861.77 |
| 6,503,392 | B1| *  | 1/2003  | Tyson ........................ 210/170 |
| 6,789,434 | B2| *  | 9/2004  | Peterson .................. 73/861.77 |

\* cited by examiner

*Primary Examiner*—Jewel Thompson
(74) *Attorney, Agent, or Firm*—Smith, Gambrell & Russell, LLP (57) ABSTRACT

A liquid flow meter including a compartment containing a pivotable volumetric measuring container with a counterbalance weight. The movement created by the counterbalance weight about the axis of rotation maintains the static filling rotational position until a specified volume capacity is achieved.

29 Claims, 5 Drawing Sheets

LIQUID FLOW METER

FIELD OF INVENTION

The present invention relates to the measurement of liquid flow through the use of a volumetric mass balance and more specifically to an apparatus for the measurement of gravity open channel flow of nonhomogeneous liquids containing suspended matter, solids, stringy materials, oils, greases and waxes. In a further aspect, the present invention relates to a method for measurement of liquid flow using the apparatus herein described.

DESCRIPTION OF PRIOR ART

The measurement of liquid flow under pressure in enclosed pipes has historically been performed through the use of turbine meters, disc meters, piston meters, Venturi (orifice) meters and pitot tubes. The principal of the Venturi meter was discovered in about 1791 by engineer J. B. Venturi based upon the conservation of energy equations previously developed by Bernoulli for incompressible liquid flow, and was first practically applied by Clemens Herschel in 1887. These meters utilize the liquid pressure differential and positive displacement properties of the liquid to drive the measurement devices and are only effective when the liquid is homogeneous and contains no debris or other materials which may clog or obstruct the measuring device. Suspended matter, solids, stringy material, debris, oils, greases, or other materials contained in the liquid stream render these devices inaccurate and ineffective, or cause complete meter failure through blockage.

The methods of prior art available for measurement of gravity open channel flow include notched weirs of various shapes, Parshall flumes, radar and sonic meters. The formulae for calculation of flow over a rectangular weir was first developed in 1823 by Francis, but required a head of one half foot or more for accuracy. Rehbock of Germany refined the formulae in 1912. Flow formulae for accurate calculation of flow over weirs of various shapes have since been developed. Weirs require a quiescent upstream flow channel for accurate measurement of flows. This quiescent flow zone requirement for accurate operation of weirs as liquid flow measurement meters causes solids contained within waste streams to settle behind the weir. Soil and organic matter collected behind the weir quickly interferes with the accuracy of the weir. A weir's required quiescent zone with low flow velocities provides unscoured wall surface areas which tend to collect and retain floating oils, greases and waxes. The accumulations of solids behind weirs and encrustation of upstream surfaces make them unsuitable for reliable measurement of untreated wastewater. Weirs require an external power source for recording flow, another factor which causes their dismissal as a low cost flow measurement metering device. Liquid surface elevation measurements for weirs require a flow stream contacting float assembly or more expensive electronic surface elevation sensing and recording devices.

Sonic meters, radar meters, magnetic meters and Parshall flumes have been demonstrated to be effective in the measurement of nonhomogenous liquids and liquids containing debris or other materials which might clog the other types of flow measurement devices. Sonic and radar meters operate as electronic sonar, transmitting a sonic wave or radar signal through the pipe wall, receiving a returned signal indicating water surface depth in the pipe and tracing particulate matter movement through the pipe for the purpose of determining flow velocity. The cross sectional area of the liquid flow and velocity determined allows calculation of the flow volume through a mathematically programmed algorithm. Sonic and radar meters have a high first cost due to their electronic complexity and require a continuous external power source for operation.

The current technology relating to Parshall flumes and its variants, including a simply contracted opening, are the most widely used methods of measurement of open channel flow for liquids containing suspended matter, solids, stringy materials, oils, greases and waxes. Parshall flumes and its variants require an external power source for recording flow. The measured fluid surface level at one point up stream of the device allows calculation of the flow quantity. An algorithm, either electronically or mechanically calculates total flow. Liquid surface elevation measurements for flumes require a flow stream contacting a float assembly or more expensive electronic surface elevation sensing device. Due to high initial cost and a required continuous external power source, Parshall flumes and their variants, while the currently time proven method of choice, are used primarily for metering large wastewater flows wherein the costs to provide the equipment, operate and maintain the equipment are offset by the derived flow information.

Externally powered flow recording devices are subject to disruption and for this reason, are not consistently reliable and dependable. The many parts of flow recorders for powered electronic or powered mechanical flow totalizers make them expensive to provide, operate and maintain. Present technology does not teach a means for the measurement of liquids containing debris and other materials in open channel gravity flow liquid streams without the requirement for an external power source to measure and record these flows.

The present state of the art does not teach the utilization of a mass balance mechanism for the measurement of gravity liquid open channel flow. Present art does not teach the utilization of a mass balance mechanism for the measurement of liquids containing a mixture of suspended solids, oils, greases or waxes as contained in wastewater or other slurries.

The measurement of liquids containing wastewater or other slurries has historically been difficult to accurately accomplish due to the propensity of such liquids to foul the measurement mechanism. Lumps, stringy, granular or adhering matter tends to obstruct the measuring mechanism of the close tolerances required for the accurate performance of state of the art turbine meters, disc meters, piston meters, Venturi meters, or pitot tubes. Such liquids are also often corrosive. Naturally occurring decay of the wastewater often creates corrosive or explosive gas mixtures. It is therefore desirable to physically separate the registering mechanical counter from the deleterious effects of exposure to the liquid measured or the gasses created by the natural decay of such liquids.

U.S. Pat. No. 4,306,457, issued Dec. 21, 1981, illustrates one form of liquid flow meter, wherein a magnet is affixed to the rotatable impeller shaft. The magnet, placed in proximity to a magnet field sensor, induces a signal as the impeller shaft rotates to electronically count and tally the impeller rotations thereby allowing physical isolation of the metering mechanism from the counter mechanism.

Another form of flow meter utilizing shaft mounted magnets is disclosed by U.S. Pat. No. 4,275,291 issued Jun. 23, 1981. This patent discloses a first magnet affixed to the rotatable impeller shaft and a second magnet placed in proximity to the first magnet, but outside the liquid flow chamber. Rotation of the second magnet is induced by the rotation of the first magnet. The rotating field generated by the second magnet generates an electrical signal used to provide a read out of flow volume.

Still another form utilizing shaft mounted magnets is illustrated by U.S. Pat. No. 4,553,433, issued Nov. 19, 1985. This patent discloses a gas meter having a first magnet attached to a rotor shaft and a second magnet attached to a indicator shaft, the second magnet being rotatable and magnetically coupled to the first magnet, so as to provide a corresponding rotation of the indicator shaft when the rotor shaft is rotated by the flow of liquid through the meter housing. In this manner a mechanical indicator movement may be driven by magnet coupling to the flow meter shaft.

Present state of the art demonstrates isolation of the liquid flow chamber from the meter counting assembly through the electrical sensing of magnet rotation or by coupling of rotation of the metering assembly to a mechanical counter. The linear coupling of repelling like poles of permanent magnets for actuation of mechanical indicator movements for use in a flow meter are not taught by the current state of the art.

According to current technology, a typical residential consumer served with both domestic water and sewer service has the incoming clean water measured through a turbine meter or rotating disc meter for service invoicing purposes. The waste water stream is then assumed to be equal to the supply stream since no viable means exists under the present state of the art to economically measure and record the volume of the waste stream. This has lead to complaints from customers alleging the volumetric charge for wastewater service is unfair because they irrigate their yard or garden, fill swimming pools, wash vehicles or undertake other activities which does not return the supplied water to the sewer system. Customers of wastewater collection and treatment systems without a metered water supply, for example served by a private groundwater well, are invoiced for waste water service on a monthly large flat rate basis. Conversely, the wastewater system operators generally receive more sewer collection system effluent water into their wastewater treatment facilities than total water sold to customers. This differential is commonly referred to as infiltration and inflow (I/I). I/I increases the cost of operations for collection systems through increased pumping costs and collection line cleaning costs due to the soil being washed into the sanitary sewer collection system by the I/I. I/I causes biological treatment process upsets in wastewater treatment plants due to the large flow variations they cause.

The United States Environmental Protection Agency currently estimates 60 percent of I/I is generated from private property. Residential service piping is typically installed on private property when the collection system is installed; or when the residence is constructed. To the residential owner, the service piping is out of sight and out of mind; unless or until it causes their sewer service to fail. As much of the housing stock of America connected to wastewater collection systems approaches 100 years of age, the service piping has exceeded its useful life, has been breached through corrosion or mechanical damage, and allows groundwater, and often surface water, to enter the system undetected and unmeasured.

The United States Environmental Protection Agency has documented and recognized the chronic nature of infiltration and inflow in wastewater collection systems. It has recently adopted a policy of requiring wastewater collection system operators experiencing problems with I/I to adopt and implement a collection system maintenance and operational management (CMOM) program toward control and elimination of sources of I/I. The commercial availability of a simple meter suitable for the measurement of wastewater reliably is, therefore, highly desirable and fulfills an unmet commercial need not disclosed in the prior art. If such a meter could be provided, it would be used to isolate the sources of I/I and thereby lower collection system and treatment system costs, both in terms of capital costs and operational costs.

The "Recommended Standards for Wastewater Facilities", 1990 Edition, published by the Great LakesUpper Mississippi River Board of State Public Health and Environmental Managers requires all pumps handling raw wastewater to be capable of passing a three inch spherical solid and have no suction or discharge opening less than 4 inches in diameter. Given this pump design criteria, it follows that any fluid meter proposed for use in raw wastewater must meet the same minimum design criteria because the pump will receive only the raw wastewater discharged to it by the collection system.

OBJECTS AND ADVANTAGES

Accordingly, several objects and advantages of the present invention are:
  (a) to provide a liquid meter suitable for use in the measurement of raw wastewater;
  (b) to provide a liquid meter which does not require an external power source;
  (c) to provide a liquid meter simple in design with few moving parts;
  (d) to provide a liquid meter which measures wastewater containing suspended solids, oils greases and waxes without substantially affecting meter accuracy;
  (e) to provide a liquid meter easily mass produced at low cost;
  (f) to provide a liquid meter with a water tight enclosure to prevent environmental concerns;
  (g) to provide a liquid meter requiring little or no maintenance;
  (h) to provide a liquid meter suitable for ground bury;
  (i) to provide a liquid meter which is tamper proof;
  j) to provide a liquid meter sealed from the flow summation mechanism;
  (k) to provide a liquid meter easily read by utility operators;
  (l) to provide a liquid meter suitable for installation in gravity sewer service systems;
  (m) to provide a liquid meter protectable from normal traffic impact damage;
  (n) to provide a liquid meter manufactured primarily by molding;
  (o) to provide a liquid meter scalable in size to accommodate various flow capacities;
  (p) to provide a liquid meter highly resistant to corrosion;
  (q) to provide a liquid meter the enclosure of which is self draining;
  (r) to provide a liquid meter with smooth interior flow pathways;
  (s) to provide a liquid meter with minimal head losses;
  (t) to provide a liquid meter adjustable for flow calibration;
  (u) to provide a liquid flow meter capable of providing a calibrated dosage discharge;
  (v) to provide a liquid flow meter capable of passing a three inch diameter spherical solid;

(w) to provide a liquid flow meter having influent and effluent openings no smaller than 4 inches in diameter; and (x) to provide a liquid flow meter fail safe in design.

Still further objects and advantages will become apparent from a consideration of the ensuing description and drawings. Objects and advantages disclosed above are not intended to limit the meter usage to wastewater only. Other uses will be apparent to those skilled in the arts.

DETAILED DESCRIPTION OF INVENTION

The present invention relates to the construction and manufacture of an entirely new and unique method of assembly of a liquid flow meter. The meter is economically and simply constructed, has but one moving part as the measuring assembly, uses no external power source, operates entirely through the use of gravity, is capable of passing 3 inch spherical solids, suspended solids, oils, greases, waxes and is therefore useful in measuring wastewater flow. It provides an economical and cost effective means of measuring wastewater flow from every wastewater connection to a sewer collection system and meets the design standards for minimal opening sizes. This ability to measure allows the customer to be invoiced for the measured flow, thus addressing the customer's claims with respect to overbilling, and conversely allows the system operator to invoice for all flows including infiltration and inflow. Customers receiving invoices for more wastewater than water supplied will have a direct motivation to repair or replace defective service piping on their private property. Replacement of defective service piping will allow the wastewater collection and treatment systems to operate more efficiently and effectively, and help eliminate system operational problems and violations caused by large flow variations. Alternatively, wastewater collection and treatment system operators will be in a position to receive income directly proportional to the wastewater quantity produced by each customer's connection to their sewer collection system.

The present invention is scalable, therefore allowing different meter sizes for differing flow quantities. Larger meters would be particularly useful in the study toward elimination of infiltration and inflow in wastewater collection systems. Historically, run time meters at pump stations have been used to estimate the flows by applying the run time to the average pumping capacity, for lack of a more accurate flow measurement method. Such studies invariably require data adjustment due to relay failures, check valve failures, pump failures and other causes. Steady state flow from any pump differs from priming (or startup) flow, causing such measurement methods to be best estimates of actual flows.

A reliable, accurate and cost effective means of measuring the flow of liquids containing mixtures of solids, oils, greases and waxes is therefore highly desirable and fulfills a currently unmet commercial need. The present invention is intended by applicants to meet this identified need and will be commercially desirable for other commercial and industrial applications requiring measurement of such fluid mixtures. The meter design is "fail safe" in that if the meter fails to function as designed, a clear opening is provided to allow the passage of all flow including a 3 inch diameter spherical solid.

Referring to the accompanying drawings, the liquid flow meter (10) is housed in a compartment enclosure, the shape of which is not important to the function of the flow meter (FIG. 1), but the shape of the outer enclosure is important to the hydraulic head at which the meter will function, with wider enclosures allowing lower hydraulic head losses through the flow metering assembly. The compartment enclosure is formed of an upper part assembly (12) and a lower case assembly (13). The preferred outer enclosure is provided with three ports: a first port or influent inlet port (14) which receives the incoming fluid stream and is fitted with a female coupling connection for pipe flow to be metered. A second port (17) which provides the discharge stream of the fluid measured and is fitted with a female coupling connection to liquid outlet piping. A third port (11) provides a connection for field flushing the meter assembly with water.

Figure 1:
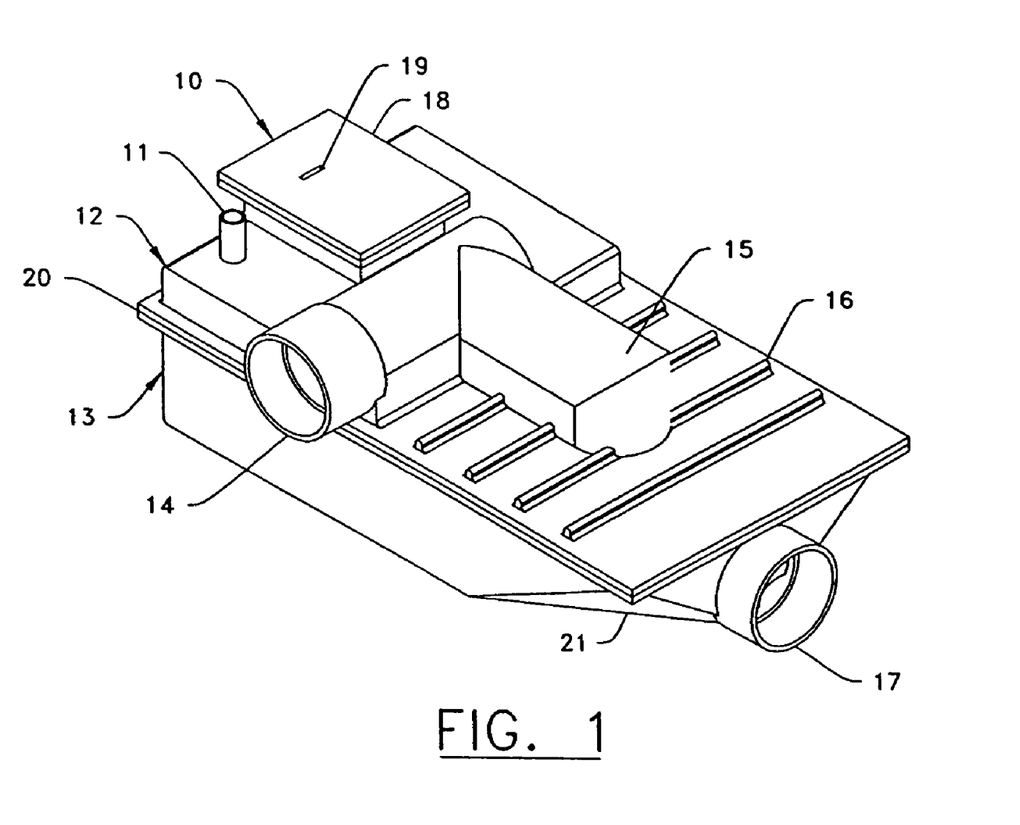
FIG. 1 is a perspective view of the liquid flow meter of the invention.
Figure 5:
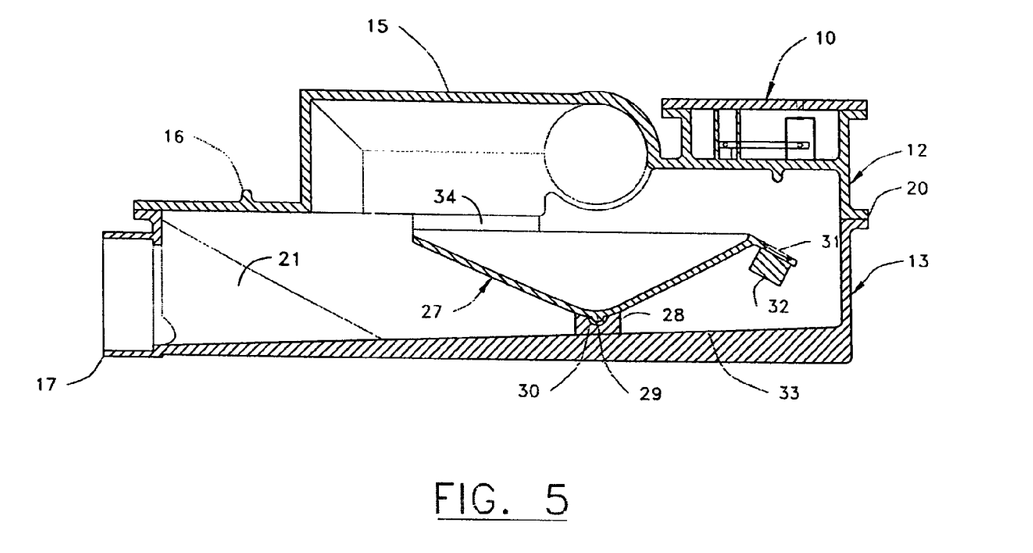
FIG. 5 is a cross sectional view of the liquid flow meter of the present invention.

The inlet port (14) is located over the centerline of the pivot (29) for the volumetric container as shown in FIG. 5 for the purpose of counteracting and distributing the momentum force caused by the inertia of the incoming flow. Effluent outlet port (17) is located with the invert, or lower point port, coincident with the invert of the outer enclosure at the lower end of the lower case assembly (13). Flushing port (11) is located coincident with the invert of the enclosure at the higher end of the lower outer enclosure as shown in FIG. 1.

Other elements shown in the drawings are a meter bypass module 15, horizontal structural reinforcing rib 16, upper and lower case flanges 20, an outlet flume 21, a pivot block 28, a pivot bearing 30, a slot and set screw 31, and a counterbalance weight 32.

Figure 2:
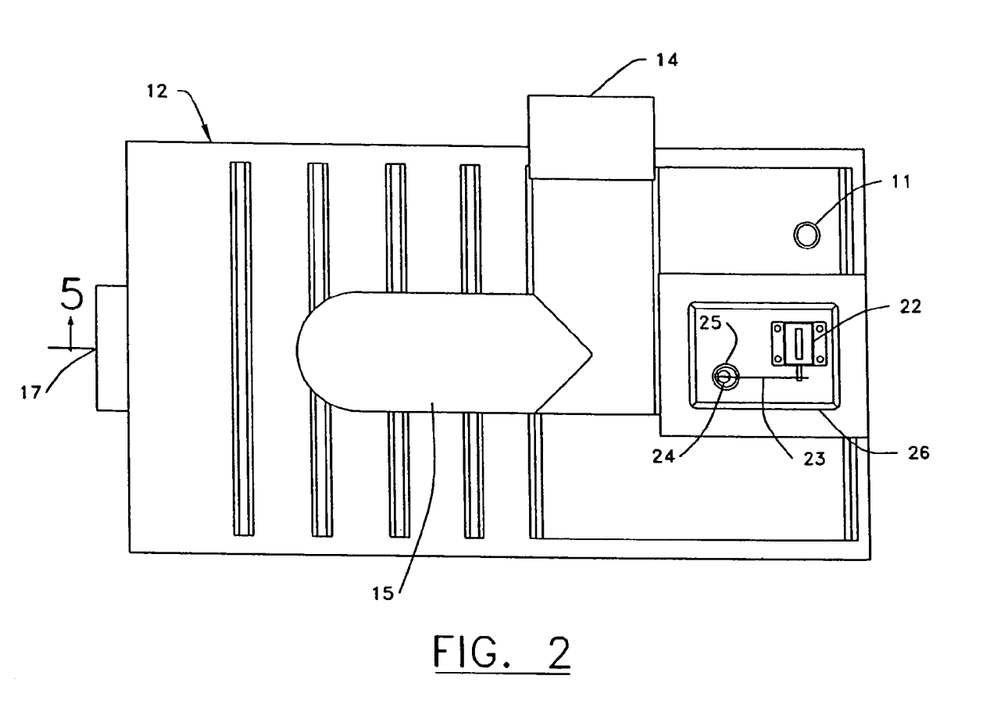
FIG. 2 is a top view of the liquid flow meter of the invention.
Figure 3:
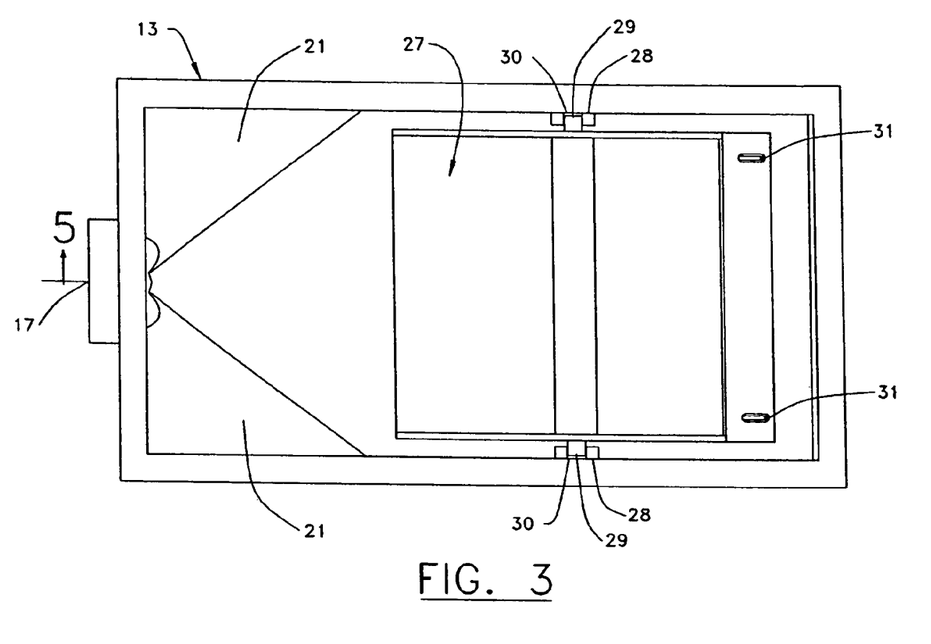
FIG. 3 is a top view of the inside of the liquid flow meter of the present invention.

In the preferred embodiment, a sealed cycle counter housing (18) is molded into the exterior of the upper case assembly (12) for the purpose of housing the cycle counter assembly (22), the cycle counter assembly being any suitable commercially available type. See FIG. 2. The cycle counter housing (18) is molded with the upper case assembly (12) of the meter enclosure on one end and has a clear lens (19) sealed to the cycle counter housing (18) on the opposing end as shown in FIG. 1. The purpose of the clear lens is to allow viewing of the cycle counter register. Mounted within the cycle counter housing (18) is the cycle counter assembly formed of the cycle counter (22), cycle counter arm (23), permanent magnet (24), magnet guide (25) and meter counter housing internal radii (26).

Actuation of the cycle counter assembly is through the upper outer enclosure of the liquid flow meter by the use of permanent magnet (24) suspended from the cycle counter arm (23) and attached thereto, which are moved through proximity to other magnets or ferrous material mounted for the purpose on or within the enclosed pivoting volumetric container positioned within the compartment enclosure. The purpose of sealing the cycle counter assembly is to prevent water, moisture and sewer gasses from contacting the cycle counter assembly, thereby reducing the effects of corrosion upon the cycle counter assembly and allowing the lens to remain clear for ease of reading the cycle counter.

Figure 4:
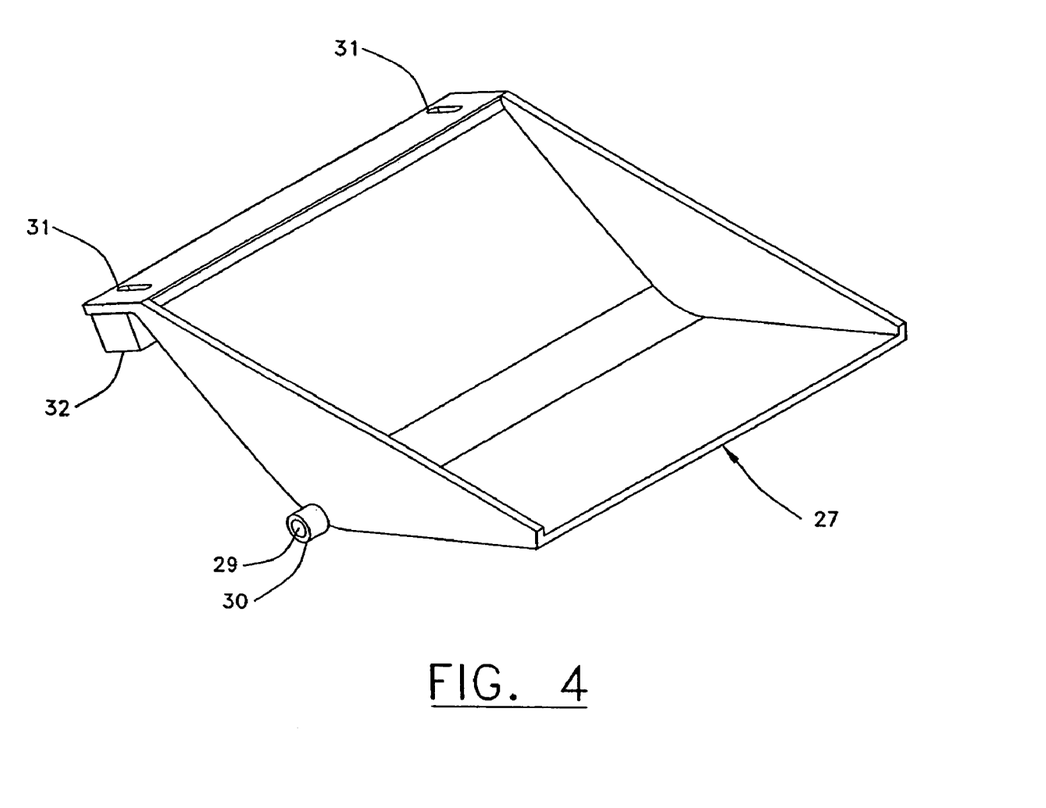
FIG. 4 is a perspective view of the volumetric container which is inside the liquid flow meter of the present invention.

Within the said flow meter enclosure, and located in the lower case assembly, is a pivoting volumetric measuring bucket assembly or container (27) (see FIGS. 4 and 5). The bucket assembly is proportioned to contain a specific volume and proportioned to have a long side and a short side relative to the horizontal axis about which it rotates. The short side of the bucket has the counterweight so that it is counterweighted to create a moment about the pivot axis (29) in excess of the moment about the horizontal pivot axis of the bucket caused by the long leg of the bucket and the fluid it contains until the specific volume is reached, were upon, the moment created by the weight of the volume of the fluid and the longer leg of the bucket overcomes the moment caused by the bucket counterweight, and the pivoting measuring bucket begins to rotate. As the pivoting measuring bucket begins to rotate, the center of gravity of the fluid and the suspended matter within the fluid within the bucket transfers away from the pivot, increasing the moment imbalance, and causing the bucket to be accelerated downward, causing the bucket to rapidly dump its specific volume contents including any solids, oils, grease or suspended matter into the lower case assembly in the direction of the effluent outlet port (17). The dumping cycle motion of the bucket is sensed through the meter enclosure through the use of permanent magnets and ferrous materials and registered by a mechanical tallying counter as commonly commercially available. The counterbalance weight of the short leg of the bucket returns the emptied bucket to the unfilled position, allowing the cycle to be repeated.

The preferred material for construction of the enclosure and the bucket is polyvinyl chloride plastic, a material widely used for the conveyance of wastewater and desirable due to its low surface tension properties and its resistance to corrosion in wastewater environments. Other synthetic plastic materials may be used to achieve similar results as will be apparent to those skilled in the art.

Installation of the meter assembly in the gravity flow conduit requires that it be set to the grade, level across the axis of the pivot assembly, and longitudinally level to insure the meter enclosure fully drains with a velocity sufficient to transport suspended matter. Typically the longitudinal grade of the bottom of the lower enclosure will be sufficient to cause a minimum liquid flow velocity greater than 2 feet per second within said lower enclosure.

When installed in a typical sewer service lateral, between for example, a residence and a gravity sewer collection system, the entire assembly will be installed below the ground surface with only the registering tallying cycle counter and the flushing attachment fitting accessible from the surface, and protected from normal surface traffic damage by a state of the art meter box with lid. It is envisioned the registering tallying cycle counter will be read monthly as is common in the industry for the reading of similar registers for water metering services. The strength of the enclosure assembly and appurtenances shall be sufficient to withstand the soil and traffic overburdens. The cycle counter enclosure may be produced in varying lengths to accommodate varying depths of burial. The flushing port will be field extendable during installation to allow ease of surface access.

Further modification and variations will be apparent to those skilled in the art from the foregoing and are intended to be encompassed by the claims appended hereto.

We claim:

1. A liquid flow meter, comprising:
   a compartment enclosure formed from an upper case part and a lower case part,
   said lower case part containing a volumetric measuring container having a specified fluid volume capacity, mounted upon a rotatable pivot having an axis of rotation,
   said axis of rotation of said volumetric measuring container being determined by location of said rotatable pivot,
   a counterbalance weight affixed to said volumetric measuring container opposite said axis of rotation, and a static filling rotational position of said volumetric measuring container limited by an external stop integral with the upper case part,
   a moment created by said counterbalance weight about said axis of rotation maintains said static filling rotational position until said specified volume capacity is achieved,
   a plurality of bearing blocks affixed to the lowercase part of said compartment enclosure for supporting said rotatable pivot,
   a rotation stop limit affixed to said lower compartment enclosure determining rotational position of the discharge position of said volumetric container,
   an influent port formed in said upper case part for directing liquid flow into said volumetric measuring container through said compartment enclosure,
   said influent port located to deliver flow approximately vertically into the approximate center of said volumetric measuring container,
   and being located to deliver flow approximately perpendicular to a centerline of said rotatable pivot and terminating after passing through said enclosure thereby providing a drip lip,
   an effluent port located in said lower case part for discharge of liquid volume of said volumetric measuring container,
   said lower case part having sloped bottom and flumage to receive flow discharge of said volumetric measuring container and to direct said liquid volume to said effluent port,
   and a counter for counting and summing the number of discharge cycles of the said volumetric container inside and affixed to said compartment enclosure.

2. The liquid flow meter according to claim 1, wherein said compartment enclosure for said volumetric measuring container is formed by plastic molding an upper case part and a lower case part.

3. The method according to claim 2 further comprising multiplying said total cycle count times said specified liquid volume capacity of said volumetric container yields total flow volume.

4. The liquid flow meter according to claim 1, wherein said lower case part containing a plurality of rotating pivot bearings.

5. The liquid flow meter according to claim 1, wherein said lower case part is molded with an integral plurality of said rotation stop limits determining the rotational position of the discharge position of the said volumetric container.

6. The liquid flow meter according to claim 1, wherein said lower case part is molded with said effluent port.

7. The liquid flow meter according to claim 1, wherein said lower case part is integrally molded with sloped bottom for self draining to said effluent port.

8. The liquid flow meter according to claim 1, wherein said lower case part is integrally molded with a flange for mating to said upper enclosure part.

9. The liquid flow meter according to claim 1, wherein said upper case part is integrally molded with a said influent conduit with drip lip.

10. The liquid flow meter according to claim 1, wherein said upper case part is integrally molded with a plurality of said rotation stops determining the rotational position of said static filling position of said volumetric container.

11. The liquid flow meter according to claim 1, wherein said upper case part is integrally molded with said mounting box for the cycle counter.

12. The liquid flow meter according to claim 1, wherein said upper case part is integrally molded with said flushing port allowing flushing of the interior of the said liquid flow meter.

13. The liquid flow meter according to claim 1, wherein said upper case part is integrally molded with a flange for mating to the lower enclosure part.

14. The liquid flow meter according to claim 1, wherein said upper case part is integrally molded with a half circle depression circumferential within mating face of said integral flange for receiving a seal of circular section.

15. The liquid flow meter according to claim 1, wherein the material of construction for meter is polyvinyl chloride plastic or other synthetic plastic.

16. The liquid flow meter according to claim 1, wherein said volumetric container is molded.

17. The liquid flow meter accoding to claim 1, wherein the material of construction for said counterbalance weight is a castable chemical resistant and dense material.

18. The liquid flow meter according to claim 1, wherein the compartment enclosure is a water tight box with permanent magnet guide conduit integrally injection molded with the said upper enclosure part to guide said permanent magnet attached by rod or tube to the lever of a mechanical counter.

19. The liquid flow meter according to claim 1, further comprising a clear glass or other clear plastic material convex lens attached and sealed to the plate lid closure of mechanical counter water tight box for reading of a art meter count register.

20. A liquid flow meter according to claim 1 with an adjustable counterblance weight, the position of said counterbalance weight being adjustable towards and from volumetric container pivot including means to secure counterbalance weight once adjusted.

21. The liquid flow meter according to claim 1 for allowing adjustment of said rotation stop limit affixed to said enclosure or mount determining rotational position of said static filling position of said volumetric container rotation stop limit, comprising:
  a hole with tapped threads through a plurality of molded stop limit lugs cast into said lower enclosure part,
  a cap screw with first nut of present art screwed thereon to act as a locking nut, screwed into said hole with tapped threads allowing adjustment of the end point of said cap screw,
  a second nut screwed onto said cap screw after passing through said hole with tapped threads,
  a block of impact resistant material with threaded hole screwed onto said cap screw and locked into position by said second nut for the purpose of distribution of impact loading,
  a plurality of stop blocks molded integrally with said volumetric container for the purpose of impacting upon said block of impact resistant material.

22. The liquid flow meter according to claim 1 which allows adjustment of said rotation stop limit affixed to said lower enclosure part determining rotational position of said discharge position of said volumetric container rotation stop limit, comprising:
  a plurality of blocks molded into said lower enclosure part located on the interior face of the lower enclosure between said axis of rotation of said rotatable pivot and end of said elongated pouring spout,
  a tapped hole in each of said plurality of blocks molded into said lower enclosure part for the purpose of receiving a cap screw,
  a impact resistant block molded to mate with impact location of said volumetric container for distribution of impact loading,
  a plurality of holes through said impact resistant block with recess for the purpose of receiving cap screws,
  a location of said plurality of holes allowing attachment of said impact resistant block to said plurality of blocks molded into said lower enclosure part mating,
  a shim located between said impact resistant block and said plurality of blocks molded into said lower enclosure part mating for providing adjustment of said rotation stop limit.

23. The liquid flow meter according to claim 1, where the counter assembly is electronic and replaces the mechanical counter shown in the figures.

24. The liquid flow meter according to claim 1, wherein the permanent magnet and the mechanical cycle counter assembly is replaced by an inductance coil and electronic counter circuitry for use in electronic cycle measurement.

25. The liquid flow meter according to claim 1, wherein the permanent magnet and mechanical cycle counter assembly is replaced by a reed switch or other magnetically operated switch for use in electronic cycle measurement.

26. The liquid flow meter according to claim 1 which incorporates a waste water sampling port to allow small amounts of waste water to be removed for laboratory analysis.

27. A fluid flow meter, comprising:
  a compartment enclosure formed from an upper case part and a lower case part,
  said lower case part containing a volumetric measuring container having a specified fluid volume capacity, mounted upon a rotatable pivot having an axis of rotation,
  said axis of rotation of said volumetric measuring container being determined by location of said rotatable pivot,
  a counterbalance weight affixed to said volumetric measuring container opposite said axis of rotation, and a static filling rotational position of said volumetric measuring container limited by an external stop integral with the upper case part,
  a moment created by said counterbalance weight about said axis of rotation maintains said static filling rotational position until said specified volume capacity is achieved,
  a plurality of bearing blocks affixed to the lowercase part of said compartment enclosure for supporting said rotatable pivot,
  a rotation stop limit affixed to said lower compartment enclosure determining rotational position of the discharge position of said volumetric container, an influent port formed in said upper case part for directing liquid flow into said volumetric measuring container through said compartment enclosure, said influent port located to deliver flow approximately vertically into the approximate center of said volumetric measuring container, and being located to deliver flow approximately perpendicular to a centerline of said rotatable pivot and terminating after passing through said enclosure thereby providing a drip lip, an effluent port located in said lower case part for discharge of liquid volume of said volumetric measuring container, a location of said influent conduit to deliver flow approximately vertically into the approximate center of said volumetric container between the centerline of said rotatable pivot and limit of said volumetric container attaching said counter weight terminating after passing through said enclosure or mount thereby providing a drip lip.

28. A method for measuring waste water flow, comprising flowing waste water into a compartment enclosure containing a volumetric container having a specified fluid volume capacity mounted upon a rotatable pivot having an axis of rotation, creating a moment differential by a counterbalance weight and thereby maintaining said volumetric bucket assembly against a rotation stop limit affixed to said compartment enclosure determining rotational position of said static filling position of volumetric bucket assembly, filling said volumetric container by flow through an influent conduit in an upper part of said compartment enclosure until moment of said specified liquid capacity results in a balanced moment about said rotational pivot axis, flowing further fluid flow into said volumetric container to result in a moment imbalance causing initiation of rotation of the volumetric container about said rotational pivot axis, said initiation of rotation resulting in flow of fluid contained within said volumetric container over an elongated pouring lip of the volumetric container, the flow of fluid over said elongated pouring lip resulting in a shift of centroid of mass of the fluid contained within said volumetric container, the shift in centroid of mass of liquid contained within said volumetric container increasing the moment imbalance about said rotatable pivot axis, increasinge the moment imbalance about said rotatable pivot axis to accelerate rotation of said volumetric container until the discharge position rotational stop limit impacts, impacting said volumetric container upon said rotational position limit of discharge position stop to thereby cause inertia momentum flow of fluid contained within the volumetric container, the inertia momentum flow of fluid contained within said volumetric container causing rapid discharge of fluid contained by the volumetric container, a lower part of said compartment enclosure buffering pulsed fluid flow of said volumetric container discharge channeling fluid into said effluent port thereby minimizing fluid remaining in the said compartment enclosure, rapidly returning the volumetric container to the rotational stop in the static filling position by a moment imbalance caused by said counterbalance weight upon emptying said volumetric container, counting the total number of cycles with a mechanical counter and summation means to provides a total cycle count.

29. The method according to claim 28, further comprising:

attaching or molding a permanent magnet into the uppermost portion of said counterbalance weight of said calibrated volumetric container, locating said permanent magnet in proximity to the upper most part of said upper enclosure for said calibrated volumetric container while resting the calibrated container upon said discharge position stop, attaching a second permanent magnet by a rod or tube to the lever of a mechanical counter, orientating the second permanent magnet so that like poles of the said permanent magnets are opposing, locating the said second permanent magnet resting upon the exterior face of the said upper compartment enclosure on coincident centerline with the first permanent magnet location.

* * * * *